(12) United States Patent
Suzuki

(10) Patent No.: US 11,654,796 B2
(45) Date of Patent: May 23, 2023

(54) COMMUNICATION SYSTEM AND SEAT UNIT

(71) Applicant: Yazaki Corporation, Tokyo (JP)

(72) Inventor: Masashi Suzuki, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 331 days.

(21) Appl. No.: 16/852,658

(22) Filed: Apr. 20, 2020

(65) Prior Publication Data

US 2020/0369180 A1 Nov. 26, 2020

(30) Foreign Application Priority Data

May 23, 2019 (JP) .............................. JP2019-096842

(51) Int. Cl.
*B60N 2/02* (2006.01)
*B60N 2/06* (2006.01)

(52) U.S. Cl.
CPC ............ *B60N 2/0244* (2013.01); *B60N 2/06* (2013.01); *B60N 2002/0264* (2013.01)

(58) Field of Classification Search
CPC ............... B60N 2/0244; B60N 2/06; B60N 2002/0264; B60R 16/00; B60R 16/005; B60R 16/02; B60R 16/023; B60R 16/0235; B60R 16/03; B60R 16/0315; H04B 3/54
See application file for complete search history.

(56) References Cited

U.S. PATENT DOCUMENTS

| | | | | |
|---|---|---|---|---|
| 2004/0100148 A1* | 5/2004 | Kindo | ................. | B60R 16/0315 307/66 |
| 2006/0276947 A1* | 12/2006 | Kaita | ................... | H01H 47/002 701/36 |
| 2007/0102999 A1* | 5/2007 | Darraba | ............... | B60N 2/0224 307/10.1 |
| 2010/0253498 A1* | 10/2010 | Rork | ...................... | B60N 2/002 297/217.2 |
| 2013/0300555 A1* | 11/2013 | Sickon | .................... | B60R 22/48 340/457.1 |

(Continued)

FOREIGN PATENT DOCUMENTS

| DE | 10 2004 008 815 A1 | 9/2005 |
|---|---|---|
| DE | 10 2015 222 687 A1 | 5/2017 |
| JP | 2013-67322 A | 4/2013 |

*Primary Examiner* — Thomas Ingram
*Assistant Examiner* — Faris Asim Shaikh
(74) *Attorney, Agent, or Firm* — Sughrue Mion, PLLC

(57) ABSTRACT

A communication system includes a seat unit, and a vehicle unit configured to wirelessly communicate with the seat unit. The seat unit includes a control section, a switch input circuit configured to output an on-off signal corresponding to an on-off state of a switch mounted on the seat, and a first power switch configured to turn power supply to the switch input circuit on and off. The vehicle unit is configured to transmit a start command. The control section is configured to switch, upon receipt of the start command during a standby state in which the first power switch is constantly turned off, to a normal state in which the first power switch is intermittently turned on, and to receive, after switching to the normal state, the on-off signal in response to turning on of the first power switch and to transmit the on-off signal to the vehicle unit.

5 Claims, 8 Drawing Sheets

(56) References Cited

U.S. PATENT DOCUMENTS

| | | | |
|---|---|---|---|
| 2014/0206302 A1* | 7/2014 | Terada | B60N 2/0715 455/90.1 |
| 2015/0032329 A1* | 1/2015 | Suzuki | B60W 50/00 701/36 |
| 2018/0304770 A1* | 10/2018 | Nishizaki | G06K 7/10366 |

* cited by examiner

COMMUNICATION SYSTEM AND SEAT UNIT

CROSS-REFERENCE TO RELATED APPLICATION

The present application claims priority from Japanese Patent Application No. 2019-096842 filed on May 23, 2019, the entire content of which is incorporated herein by reference.

BACKGROUND

The present invention relates to a communication system and a seat unit. The communication system includes the seat unit that is mounted on a seat of a vehicle and operates upon receiving power supply from a battery, and a vehicle unit that wirelessly communicates with the seat unit.

A related art signal receiving device performs infrared communication between a slide seat and a vehicle, and uses a battery as a power source of a slide seat side, so that routing of wire harness between the slide seat and the vehicle is avoided (see, e.g., JP2013-67322A).

However, according to the signal receiving device described above, communication between the slide seat and the vehicle is being performed even when communication, with the slide seat is not necessary. For this reason, battery exhaustion occurs quickly.

SUMMARY

Illustrative aspects of the present invention provide a communication system capable of extending battery life and to provide a seat unit.

According to an illustrative aspect of the invention, a communication system includes a seat unit configured to be mounted on a seat of a vehicle and to receive power supply from a battery to operate, and a vehicle unit configured to wirelessly communicate with the seat unit. The seat unit includes a control section, a switch input circuit configured to output, to the control section, an on-off signal corresponding to an on-off state of a switch mounted on the seat, and a first power switch configured to turn the power supply to the switch input circuit on and off. The vehicle unit is configured to transmit as start command. The control section is configured to switch, upon receipt of the start command during a standby state in which the first power switch is constantly to off, to a normal state in which the first power switch is intermittently turned on, and to receive, after switching to the normal state, the on-off signal in response to turning on of the first power switch and to transmit the on-off signal to the vehicle unit.

Other aspects and advantages of the invention will be apparent from the following description, the drawings and the claims.

DETAILED DESCRIPTION

Hereinafter, exemplary embodiments of the present invention will be described with reference to the drawings.

Figure 1:
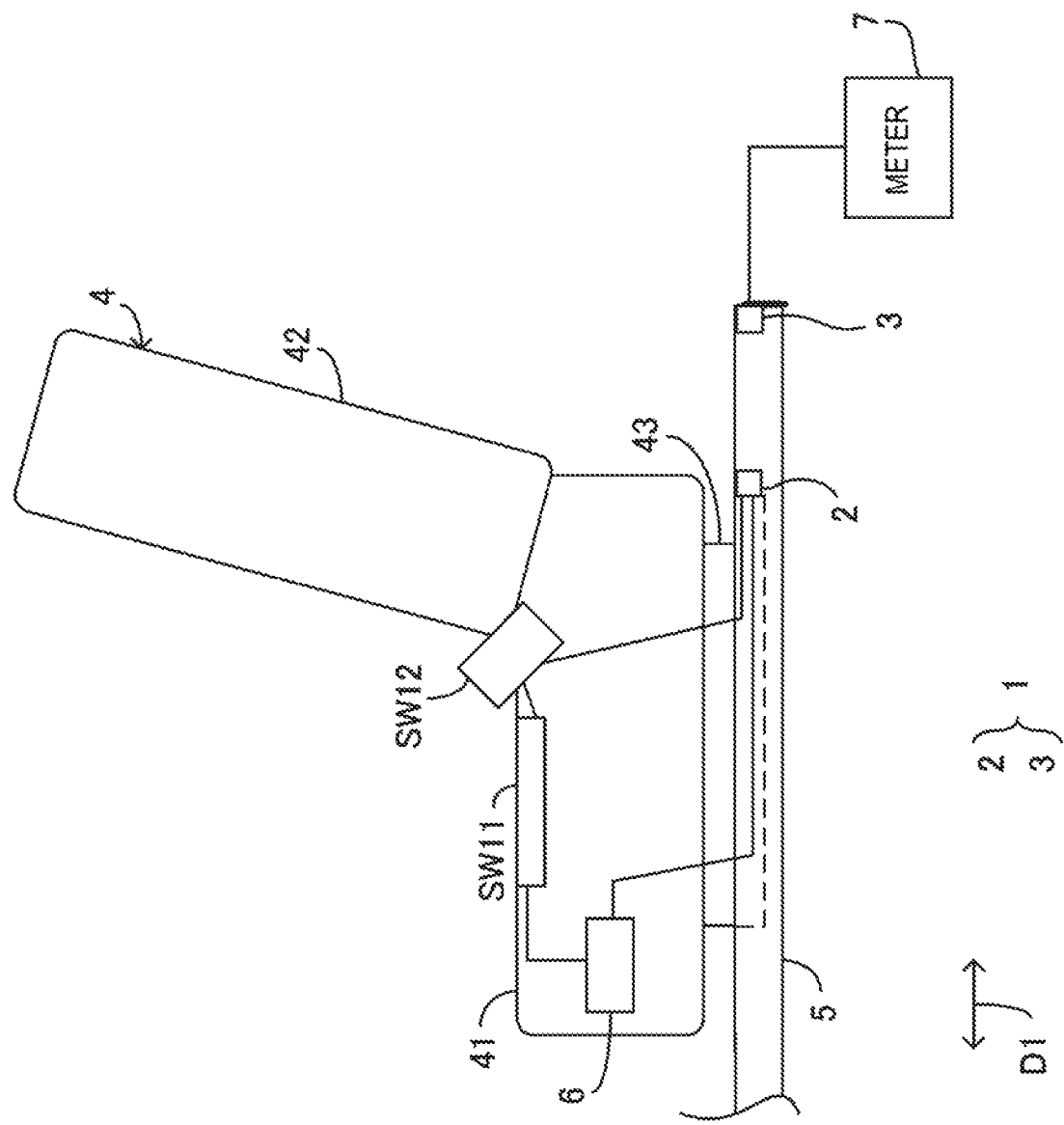
FIG. 1 is a configuration diagram illustrating an embodiment of a communication system of the invention.

As illustrated in FIG. 1, a communication system 1 according to the present embodiment includes a seat unit 2 provided on a slide seat (seat) 4, and a vehicle unit 3 provided on a vehicle (vehicle body). The communication system 1 is a system that transmits, optically and wirelessly, an on-off state of a seating switch SW11 and a buckle switch SW12, which are disposed on the slide seat 4, from the seat unit 2 to the vehicle unit 3.

The slide seat 4 is mounted on the vehicle, and mainly includes a seat cushion 41, a seat back 42, and an upper rail 43. With the upper rail 43 attached to a lower surface of the seat cushion 41, and with a rail 5 that is disposed below the seat cushion 41 and to which the upper rail 43 is slidably attached, the slide seat 4 is slidable along a front-rear direction D1 of the vehicle.

The seating switch SW11 is one of switches mounted on the slide seat 4. The seating switch SW11 is, for example, disposed in the seat cushion 41, is pressed to be turned on when an occupant sits on the slide seat 4, and is turned off when the occupant gets out of the slide seat 4. Seating of the occupant can be detected based on an on-off state of the seating switch SW11.

The buckle switch SW12 is one of the switches mounted on the slide seat 4. The buckle switch SW12 is provided in a buckle of a seat belt, is turned off when a tongue thereof is inserted into the buckle of the seat belt, and is turned on when the tongue is pulled out. Seat belt wearing of the occupant can be detected based on an on-off state of the buckle switch SW12.

One seat unit 2 is mounted on one slide seat 4, and operates depending on the battery 6. In the present embodiment, the battery 6 is constituted by a primary battery that cannot be charged, and is, for example, a battery that needs to be regularly replaced, such as at the time of vehicle inspections.

Further, in the present embodiment, an example in which the seat unit 2 is mounted on all the slide seats 4 (driver's seat, assistant driver's seat, and rear seats) mounted on the vehicle will be described, and the invention is not limited thereto. The seat unit 2 may be mounted on only the slide seat 4 serving as the driver's seat, or may be mounted on only the slide seats 4 serving as the driver's seat and the assistant driver's seat.

For example, the seat unit 2 is attached to the upper rail 43, and a light receiving circuit 23 and a light emitting circuit 24 (FIG. 2) are arranged to face a light emitting circuit. 33 and a light receiving circuit 32 (FIG. 2) of the vehicle unit 3 attached to the rail 5. Accordingly, it is possible to perform optical wireless communication between the seat unit 2 and the vehicle unit 3.

Figure 2:
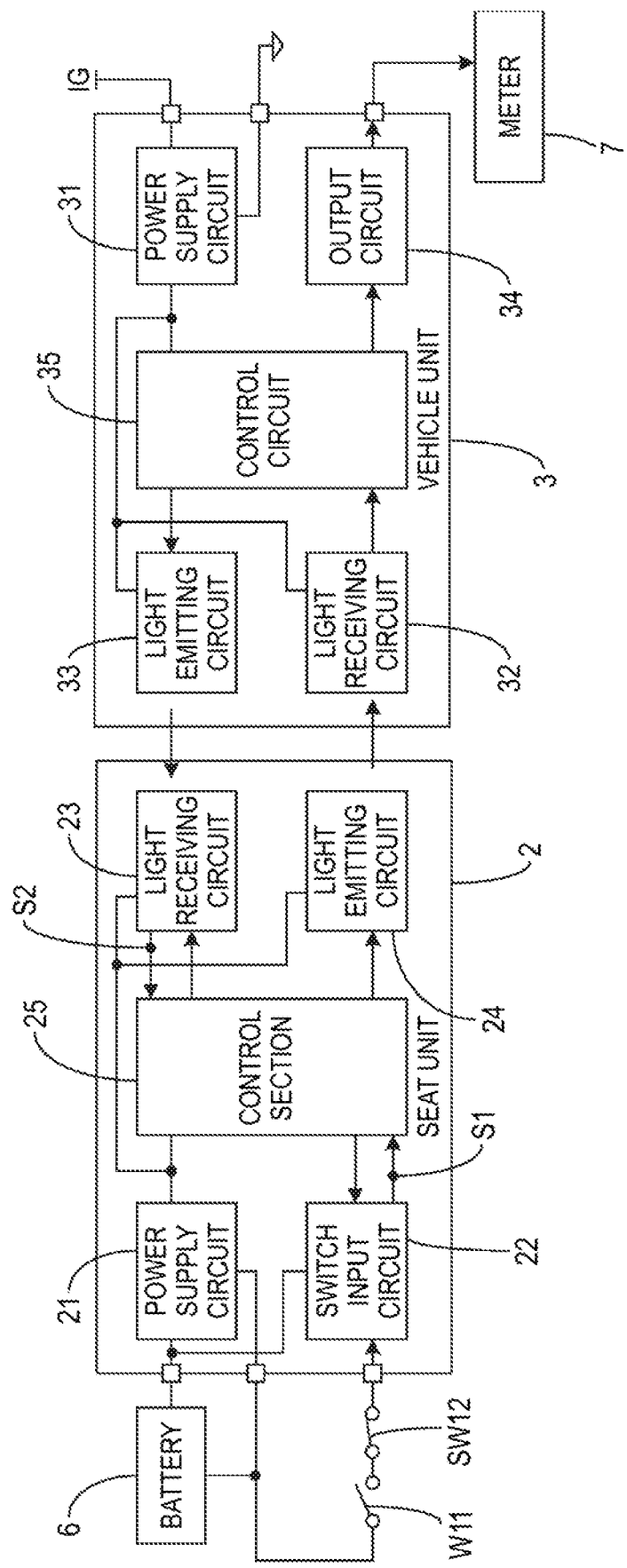
FIG. 2 is an electrical configuration diagram of the communication system illustrated in FIG. 1.

As illustrated in FIG. 2 the seat unit 2 includes a power supply circuit 21, a switch input circuit 22, the light receiving circuit 23, the light emitting circuit 24, and a control section 25.

Figure 3:
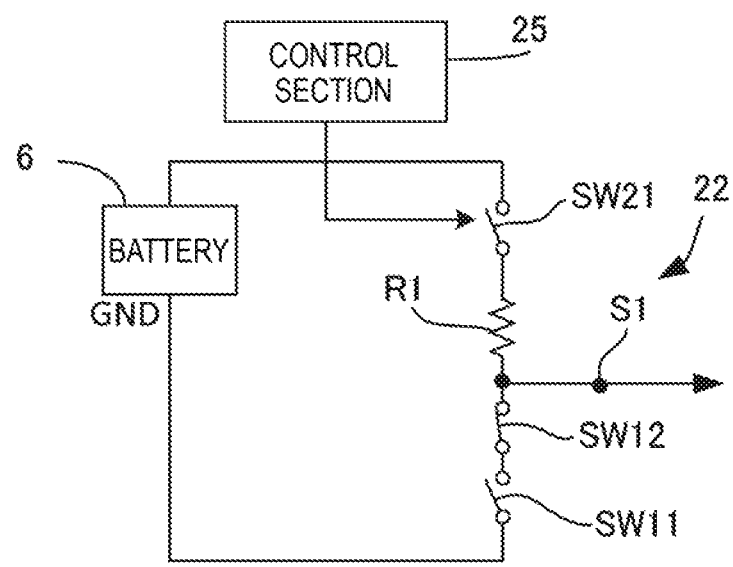
FIG. 3 is an electrical configuration diagram illustrating an example of a switch input circuit illustrated in FIG. 2.

The power supply circuit 21 is a well-known constant voltage source that generates a power supply of 5V by the battery 6. The switch input circuit 22 is a circuit that outputs a pulsed on-off signal of a Hi level or a Lo level in accordance with an on-off state of the switches SW11 and SW12 mounted on the slide seat 4. As illustrated in FIG. 3, the switch input circuit 22 includes a current: limiting resistor R1 and a first power switch SW21 that is connected in series to the current limiting resistor R1. In the switch input circuit 22, the current limiting resistor R1, and the seating switch SW11 and the buckle switch SW12 are connected in series between both ends of the battery 6. The switch input circuit 22 is a well-known switch on and off detection circuit that outputs a voltage between the current limiting resistor R1 and the switches SW11 and SW12 as an on-off signal S1.

In the present embodiment, the seating switch SW11 and the buckle switch SW12 are connected in series to a low side between the ground and the switch input circuit 22. Accordingly, when both of the switches SW11 and SW12 are turned on, a pulsed on-off signal S1 of a Lo level is output from the switch input circuit 22, and when either of the switches SW11 and SW12 is turned off, a pulsed on-off signal S1 of a Hi level is output from the switch input circuit 22. The first power switch SW21 is constituted by a transistor or the like, and is connected closer to a positive electrode side of the battery 6 than the current limiting resistor R1. When the first power switch SW21 is turned on and the switches SW11 and SW12 are turned on, a current of about 3 mA flows from the battery 6, and the switch input circuit 22 outputs an on-off signal S1 corresponding to the on-off state of the switches SW11 and SW12 to the control section 25 to be described below.

Figure 4:
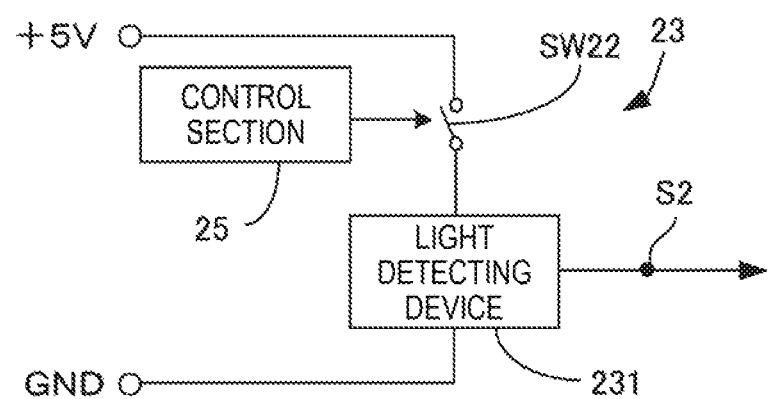
FIG. 4 is an electrical configuration diagram illustrating an example of a light receiving circuit illustrated in FIG. 2.

As illustrated in FIG. 4, the receiving circuit 23 includes a light detecting device 231 and a second power switch SW22 that is connected in series to the light detecting device 231. The light detecting device 231 is constituted by a light detecting device such as a photodiode. When the second power switch SW22 is turned on and power is supplied, the light detecting device 231 converts an optical signal into a light detection signal S2, which is an electrical signal, and outputs the electrical signal to the control section 25 to be described below.

Figure 5:
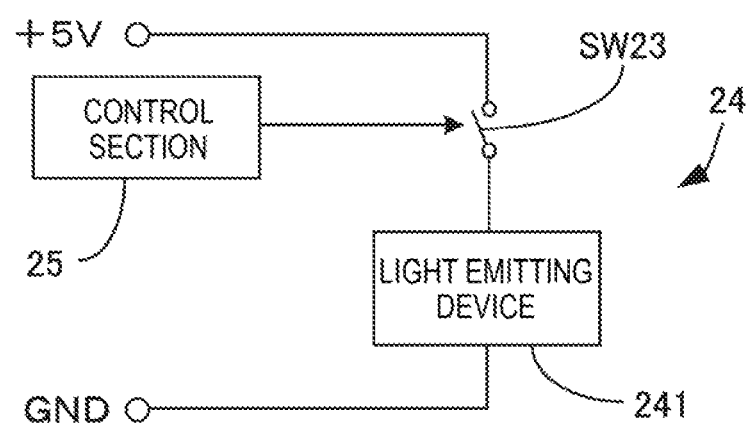
FIG. 5 is an electrical configuration diagram illustrating an example of a light emitting circuit illustrated in FIG. 2.

As illustrated, in FIG. 5, the light emitting circuit 24 includes a light emitting device 241 and a third power switch SW23 that is connected in series to the light emitting device 241. The light emitting device 241 is constituted by a light emitting device such as a light emitting diode, is turned on when the third power switch SW23 is turned on and power is supplied, and is turned off when the third power switch SW23 is turned off and power is cut off.

The control section 25 is constituted by a microcomputer, which includes a central processing unit (CPU) and a memory such as a read only memory (ROM) and a random access memory (RAM), and controls the entire seat unit 2. The on-off signal S1 from the switch input circuit 22 and the light detection signal S2 from the light receiving circuit 23 are input to the control section 25. The first to third power switches SW21 to SW23 are connected to the control section 25, and the control section 25 can control on and off of the first to third power switches SW21 to SW23.

The control section 25 can switch between a sleep state thereinafter referred to as an SLP state) and a wakeup state thereinafter referred to as a WUP state). The SLP state (=standby state) is a state in which power consumption can be kept low by decreasing a processing speed (delaying a clock). The WUP state (=normal state) is a state in which the processing speed can be raised (the clock is quickened) while the power consumption is increased.

As illustrated in FIG. 2, the vehicle unit 3 includes a power supply circuit 31, the light receiving circuit 32, the light emitting circuit 33, an output circuit 34, and a control circuit 35. In the present embodiment, the power supply circuit 31 is a well-known constant voltage source that is connected to an IG power supply line to which power is supplied from a battery when the ignition (IG) is turned on, and that generates a power supply of 5V from a battery mounted on the vehicle. The battery is constituted by a secondary battery and is charged by an alternator.

The light receiving circuit 32 converts an optical signal into an electrical signal and outputs the electrical signal to the control circuit 35 to be described below. Turning-on of the light emitting circuit 33 is controlled by the control circuit 35 to be described below. The output circuit 34 is connected to a meter 7. The control circuit 35 is constituted by a microcomputer, which includes a CPU and a memory such as a ROM and a RAM, and controls the entire vehicle unit 3. The control circuit 35 detects non-wearing of a seat belt during seating of an occupant via optical communication with the seat unit 2, and displays a warning on the meter 7.

Figure 6:
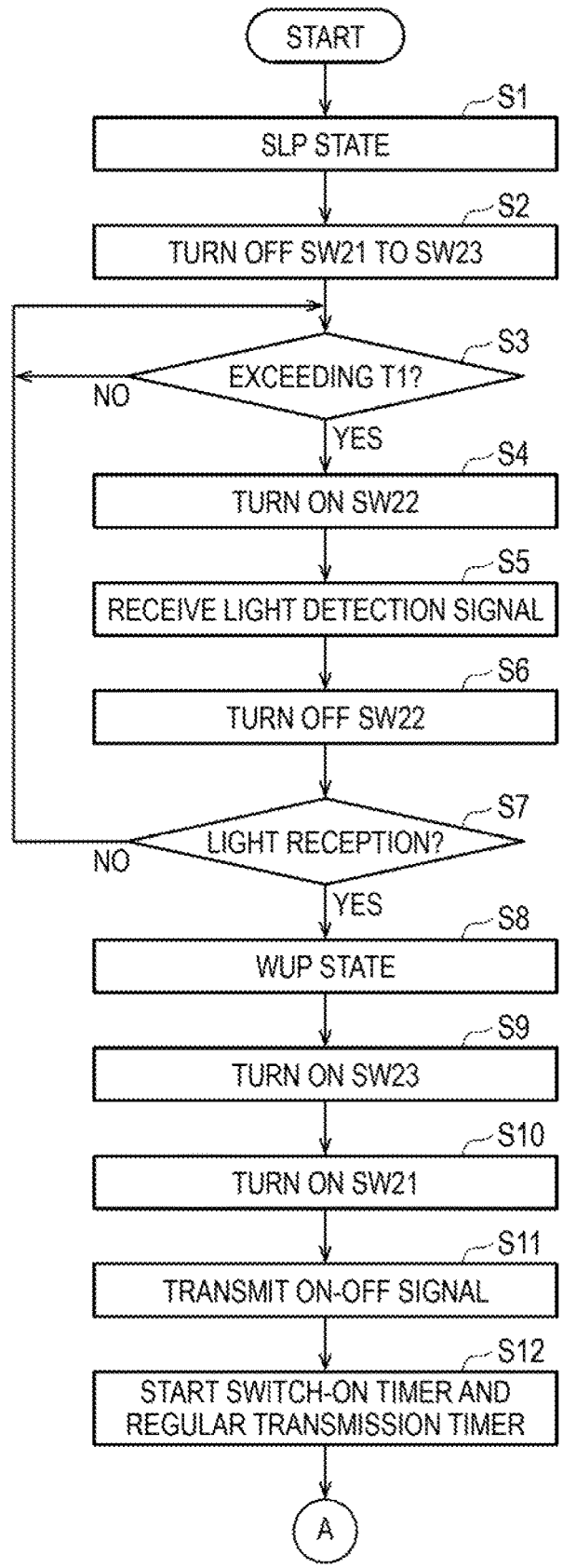
FIG. 6 is a flowchart illustrating a processing procedure of a seat unit illustrated in FIG. 1.
Figure 7:
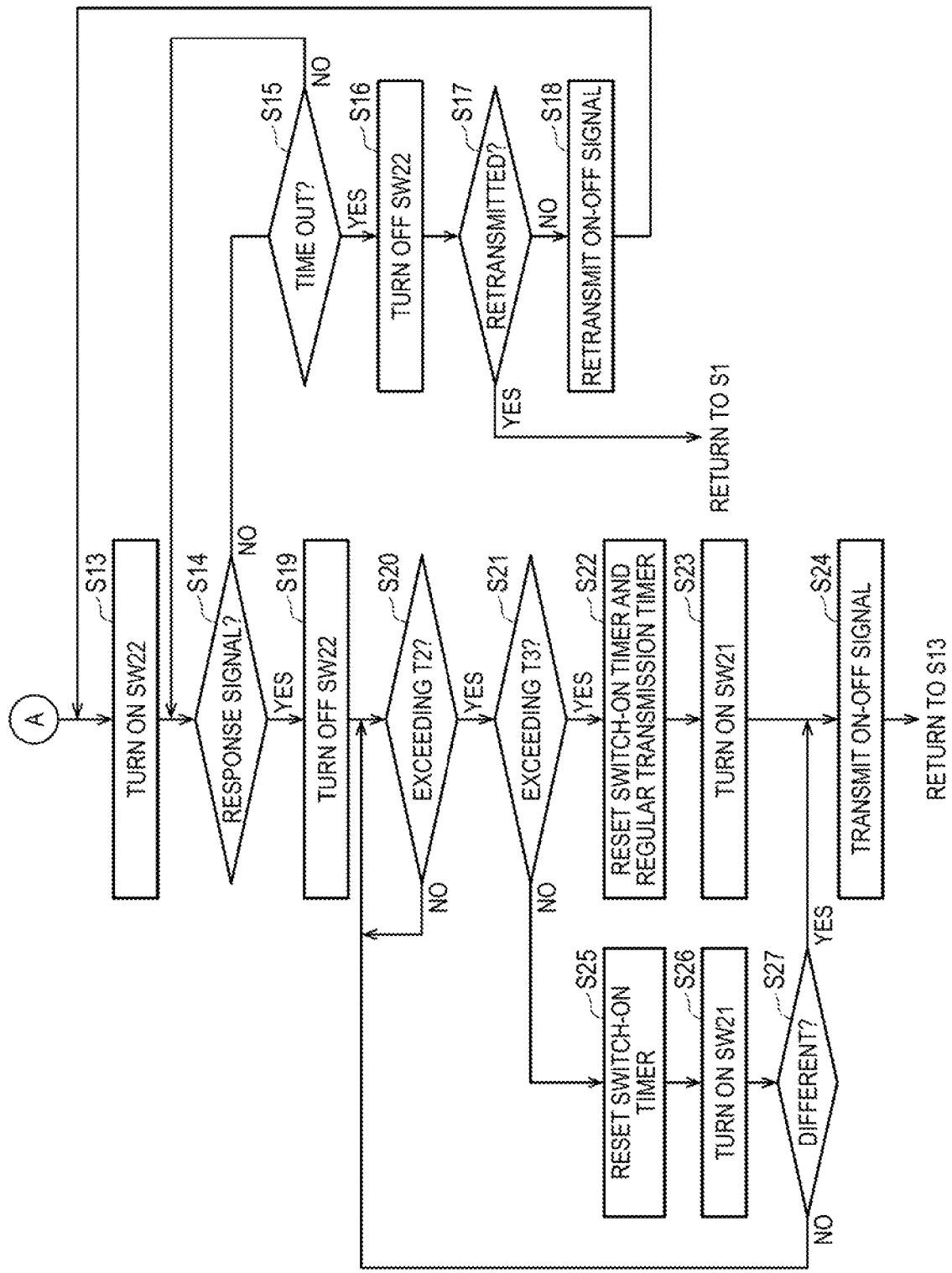
FIG. 7 is a flowchart illustrating a continuation of the flowchart illustrated in FIG. 6.
Figure 8:
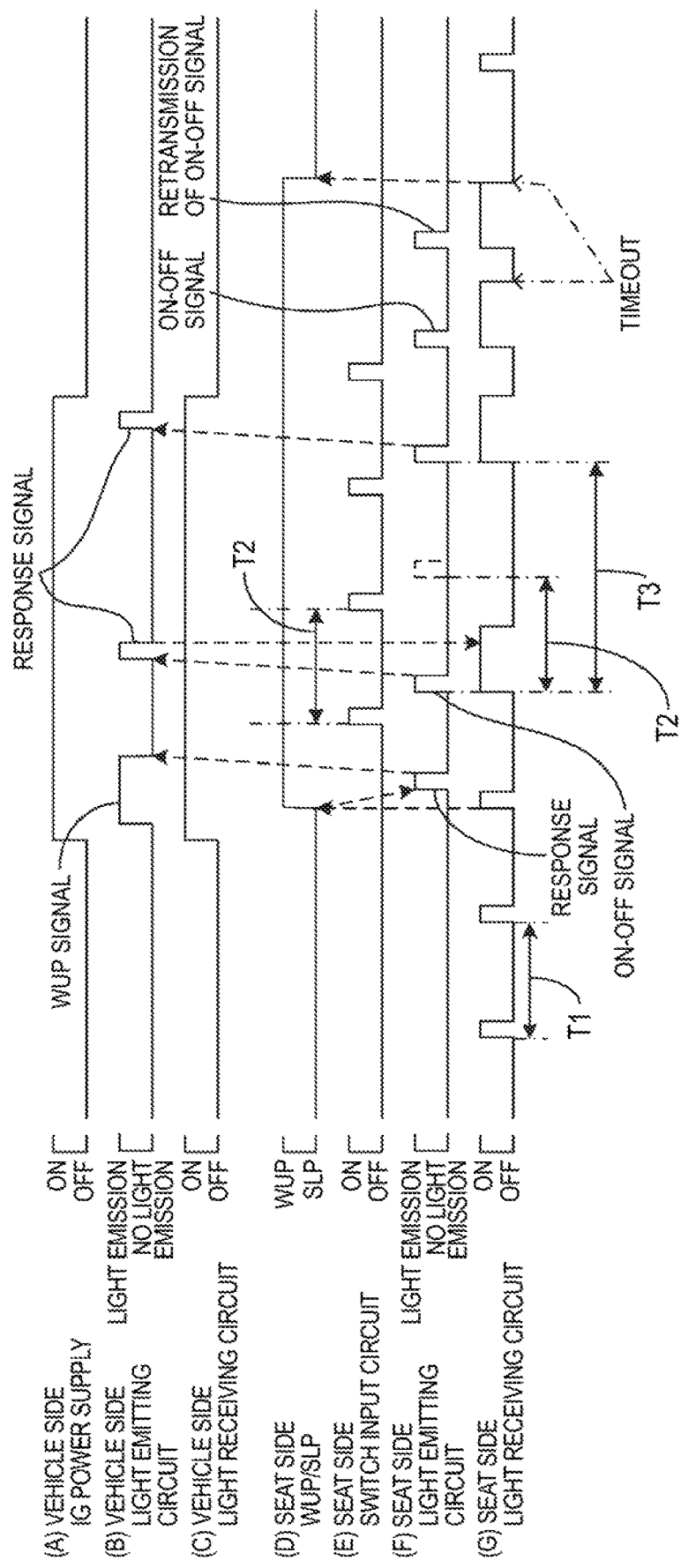
FIG. 8 is a timing chart illustrating on and off of an ignition, a light emitting condition of a light emitting circuit of a vehicle unit, power on and off of a light receiving circuit of the vehicle unit, a state of a seat unit, power on and off of a switch input circuit, a light emitting condition of a light emitting, circuit of the seat unit, and power on and off of a light receiving circuit of the seat unit.

Next, operations of the communication system 1 having the configuration described above will be described below with reference to FIGS. 6 to 8. FIGS. 6 and 7 are flowcharts illustrating a processing procedure of the control section 25 of the seat unit 2 (hereinafter, also simply referred to as a seat unit). FIG. 8 is a timing chart illustrating a state of each section of the communication system 1.

First, when the power is turned on, the control section 25 of the seat unit 2 first switches itself to an SLP state (step S1). The seat unit 2 turns off the first, to third power switches SW21 to SW23 (step S2). Accordingly, power supply to the switch input circuit 22, the light detecting device 231, and the light emitting device 241 is cut off.

Further, the seat unit 2 starts a regular light reception timer, and determines whether the regular light reception timer is equal to or longer than a first predetermined time T1 (step S3). If the regular light reception timer is equal to or longer than the first predetermined time T1 (Y in step S3), the seat unit 2 resets the regular light reception timer, and proceeds to the next step S4.

In step S4, the seat unit 2 turns on the second power switch SW22 to supply power to the light detecting device 231. Thereafter, the seat unit 2 acquires the light detection signal S2 (step S5), turns off the second power switch SW22, and cuts off the power supply to the light detecting device 231 (step S6). Next, the seat unit 2 determines whether the light detection signal S2 acquired in step S5 is a signal indicating light reception (step S7). If the signal indicates no light reception, the seat unit 2 returns to step S3 again.

When the IG is turned on, the control circuit 35 of the vehicle unit 3 (hereinafter, also simply referred to as the vehicle unit 3) supplies power to the light receiving circuit 23 in conjunction therewith so that the light detecting device 231 can receive an optical signal from the seat unit 2 (FIGS. 8-A and C). The vehicle unit 3 constantly supplies power to the light receiving circuit 23 while the IG is on. When the IG is turned on, the vehicle unit 3 turns on the light emitting circuit 33 to transmit an optical signal (WUP signal) to the seat unit 2 (FIG. 8-B).

When the light detecting device 231 receives the optical signal (WUP signal) from the vehicle unit 3 while the second power switch SW22 is turned on by the control section 25 of the seat unit (Y in step S7), the control section 25 of the seat unit 2 switches itself to a WUP state (step S8). Thereafter, the seat unit 2 has the third power switch SW23 turned on for several hundred milliseconds, causes the light emitting device 241 to emit light to transmit an optical signal (response signal) to the vehicle unit 3 (step S9). When the vehicle unit 3 receives the optical signal (response signal) from the seat unit 2 while emitting the WUP signal, the vehicle unit 3 stops light emission (FIGS. 8-B and F).

Next, the seat unit 2 has the first power switch SW21 turned on for several hundred milliseconds (step S10), acquires an on-off signal S1, controls the third power switch SW23 to turn on the light emitting device 241, and transmits the on-off signal S1 (step S11). Thereafter, the seat unit 2 starts a switch-on timer and a regular transmission timer (step S12). Further, the seat unit 2 turns on the second power switch SW22 (step) S13), and makes it possible to receive the optical signal from the vehicle unit 3.

Upon receiving the on-off signal S1, the vehicle unit 3 transmits a response signal (FIGS. 8-B and F). If the optical signal (response signal) from the vehicle unit 3 cannot be received (N in step S14), the seat unit 2 determines whether a timeout occurs (step S15). If no timeout occurs (N in step S15), the seat unit 2 returns to step S14, if a timeout occurs (Y in step S15), the seat unit 2 turns off the second power switch SW22 to cut off the power supply to the light receiving circuit 23 (step S16).

Thereafter, the seat unit 2 determines whether the on-off signal S1 has been retransmitted a predetermined number of times (step S17). If retransmission has been performed (Y in step S17), the seat unit 2 determines that communication with the vehicle unit 3 cannot be performed, returns to step S1, and switches to the SLP state.

If retransmission has not been performed (N in step S17), the seat unit 2 retransmits the on-off signal S1 (step S18), and returns to step S13. On the other hand, when the response signal is received (Y in step S14), the seat unit 2 turns off the second power switch SW22 to cut off the power supply to the light receiving circuit 23 (step S19).

Thereafter, when the switch-on timer exceeds a second predetermined time T2 (Y in step S20) and the regular transmission timer exceeds a third predetermined time T3 (=T2×n (n is an integer of 2 or more)) (step S21), the seat unit 2 resets the switch-on timer and the regular transmission timer (step S22). Next, the seat unit 2 has the first power switch SW21 turned on for several hundred milliseconds, and acquires the on-off signal S1 during the several hundred milliseconds (step S23). Thereafter, the seat unit 2 transmits the acquired on-off signal S1 (step S24), and returns to step S13.

On the other hand, if the switch-on timer exceeds the second predetermined time T2 (Y in step S20) but the regular transmission timer does not exceed the third predetermined time T3 (N in step S21), the seat unit 2 resets only the switch-on timer (step S25). Thereafter, the seat unit 2 has the first power switch SW21 turned on for several hundred milliseconds, and acquires the on-off signal S1 during the several hundred milliseconds (step S26). Thereafter, if the acquired on-off signal S1 is different from a previously transmitted on-off signal S1 (Y in step S27), the seat unit 2 proceeds to step S24 and transmits the on-off signal S1.

On the other hand, if the acquired on-off signal S1 is the same as the previously transmitted on-off signal S1, the seat unit 2 returns to step S18 without transmitting the on-off signal S1.

According to the embodiment described above, as illustrated in FIG. 8-D to F, in the SLP state, the seat unit 2 constantly turns off the first and third power switches SW21 and SW23, and constantly cuts off the power supply to the switch input circuit 22 and the light emitting circuit 24 (step S2). In the SLP state, as illustrated in FIG. 8-G, the seat unit 2 intermittently turns on the second power switch SW22 in each first predetermined time T1 so that the light detecting device 231 can receive the optical signal (WUP signal) from the vehicle unit 3 intermittently (steps S3 to S6).

Figure 9:
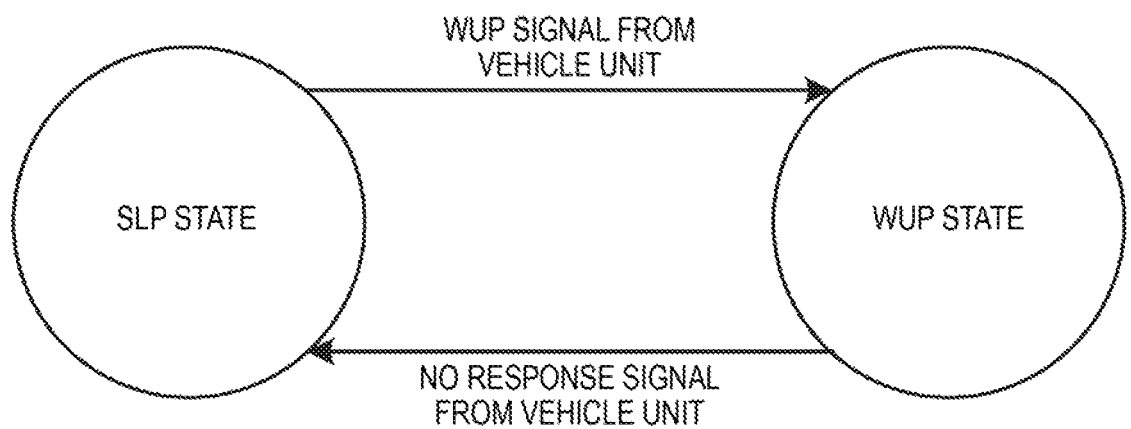
FIG. 9 is a state transition diagram of the seat unit illustrated in FIG. 1.

As illustrated in FIG. 9, upon receiving the WUP signal from the vehicle unit 3, the seat unit 2 switches from the SLP state to the WUP state. In the WUP state, as illustrated in FIG. 8-E, the seat unit 2 intermittently turns on the first power switch SW21 in each second predetermined time T2, and acquires the on-off signal S1 from the switch input circuit 22 (steps S20, S23, and S26), That is, only when the vehicle unit 3 transmits the WUP signal, the seat unit 2 switches from the SLP state, in which the first power switch SW21 is constantly off, to the normal state in which the seat unit 2 is intermittently turned on. Accordingly, the power is not constantly supplied to the switch input circuit 22, and the battery life can be extended.

According to the embodiment described above, as illustrated in FIG. 9, when the response signal from the vehicle unit 3 cannot be received (Y in step S17), the seat unit 2 switches from the WUP state to the SLP state (step S1). Therefore, when it is determined that the vehicle unit 3 is not required to communicate with the seat unit 2 and does not transmit the response signal, or when the vehicle unit 3 fails, the seat unit 2 spontaneously switches to the SLP state having low power consumption. Moreover, in the SLP state, power is intermittently supplied to die light detecting device 231. In the WUP state, power is supplied to the light detecting device 231 only during a period in which the response signal can be received after the on-off signal S1 is transmitted (steps S13, S14, and S19). Power is not constantly supplied to the light detecting device 231 even in the SLP state or the normal state, and thus the battery life can be further extended.

According to the embodiment described above, only when the on-off signal S1 is different from the previously transmitted one (Y in step S27), the on-off signal S1 is transmitted from the seat unit 2 to the vehicle unit 3. Accordingly, the on-off signal S1 is not transmitted every time the on-off signal S1 is input. Moreover, since the on-off signal S1 is also regularly transmitted at a timing of regular communication (y in step S21), even if there is no change in the on-off signal S1, it is possible to perform communication with the vehicle unit 3 and switch to the SLP state. Accordingly, the battery life can be further extended.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to the embodiment described above, the seat unit 2 switches to the SLP state when the response signal from the vehicle unit 3 cannot be received, and the invention is not limited thereto. The vehicle unit 3 may transmit the SLP signal at a timing of IG off, and the seat unit 2 may switch to the SLP state in response to reception of the SLP signal.

According to the embodiment described above, the seat unit 2 transmits the on-off signal S1 from the switch input circuit 22 only when the on-off signal from the switch input circuit 22 is different from the previously transmitted one, if not at the timing of regular communication, and the invention is not limited thereto. The seat unit 2 may transmit the on-off signal S1 every second predetermined time T2.

According to an aspect of the exemplary embodiments described above, a communication system (1) includes a seat unit (2) configured to be mounted on a seat (4) of a vehicle and to receive power supply from a battery (6) to operate, and a vehicle unit (3) configured to wirelessly communicate with the seat unit (2). The seat unit (2) includes a control section (25), a switch input circuit (22) configured to output, to the control section (25), an on-off signal (S1) corresponding to an on-off state of a switch (SW11, SW12) mounted on the seat (4), and a first power switch (SW21) configured to turn the power supply to the switch input circuit (22) on and off. The vehicle unit (3) is configured to transmit a start command. The control section (25) is configured switch, upon receipt of the start command during a standby state in which the first power switch (SW21) is constantly turned off, to a normal state in which the first power switch (SW21) is intermittently turned on, and to receive, after switching to the normal state, the on-off signal (S1) in response to turning on of the first power switch (SW21) and to transmit the on-off signal (S1) to the vehicle unit (3).

With this configuration, only when the vehicle unit transmits the start command, the seat unit switches from the standby state, in which the first power switch is constantly off, to the normal state in which the first power switch is intermittently turned on, and transmits the on-off signal input from the switch input circuit. Accordingly, the power is not constantly supplied to the switch input circuit, and the battery life can be extended.

The vehicle unit (3) may be configured to transmit a response signal upon receipt of the on-off signal (S1) from the seat unit (2). The seat unit (2) may further include a light detecting device (231) configured to receive the response signal from the vehicle unit (3), and a second power switch (SW22) configured to turn the power supply to the light detecting device (231) on and off. The control section (25) is configured to intermittently turn on the second power switch (SW22) during the standby state to allow the light detecting device (231) to receive the start command, and to turn off the second power switch (SW22) when the light detecting device (231) receives the response signal after the second power switch (SW22) is turned on in response to a transmission of the on-off signal (S1) during the normal state, and to switch, after the transmission of the on-off signal (S1), to the standby state when the light detecting device (231) is unable to receive the response signal.

With this configuration, the seat unit switches to the standby state when being, unable to receive the response signal from the vehicle unit. Therefore, when it is determined that the vehicle unit is not required to communicate with the seat unit and does not transmit the response signal, or when the vehicle unit fails, the seat unit spontaneously switches to the standby state having low power consumption. Moreover, in the standby state, power is intermittently supplied to the light detecting device. In the normal state, power is supplied to the light detecting device only during a period in which the response signal can be received after the on-off signal is transmitted. Power is not constantly supplied to the light detecting device even in the standby state or the normal state, and thus the battery life can be further extended.

The control section (25) may be configured to transmit the input on-off signal (S1) when the on-off signal (S1) is received at a timing for a regular communication, and the control section (25) may be configured to transmit, when the on-off signal (S1) is received at a timing other than the timing for the regular communication, the on-off signal (S1) only when the on-off signal (S1) is different from a previously transmitted on-off signal (S1).

With this configuration, since the on-off signal is transmitted from the seat unit to the vehicle unit only when the on-off signal is different from the previously transmitted on-off signal, the on-off signal is not transmitted every time the on-off signal is input. Moreover, since the on-off signal is also regularly transmitted at a timing of regular communication, even if there is no change in the on-off signal, it is possible to perform communication with the vehicle unit and switch to the standby state. Accordingly, the battery life can be further extended.

According to another aspect of the exemplary embodiments described above, a seat unit (2) is configured to be mounted on a seat (4) of a vehicle and to receive power supply from a battery (6) to operate, the seat unit (2) including a control section (25), a switch input circuit (22) configured to output, to the control section (25), an on-off signal (S1) corresponding to an on-off state of a switch (SW11, SW12) mounted on the seat (4), and a first power switch (SW21) configured to turn the power supply to the switch input circuit (22) on and off. The control section (25) is configured to switch, upon receipt of a start command during a standby state in which the first power switch (SW21) is constantly turned off, to a normal state in which the first power switch (SW21) is intermittently turned on, and to receive, after switching to the normal state, the on-off signal (S1) in response to turning on of the first power switch (SW21) and to transmit the on-off signal (S1) to a vehicle unit (3).

What is claimed is:

1. A communication system comprising:
    a seat unit configured to be mounted on a seat of a vehicle and to receive power supply from a battery to operate; and
    a vehicle unit comprising a processor and a transmitter, the vehicle unit configured to wirelessly communicate with the seat unit,
    wherein the seat unit comprises:
    a processor;
    a switch input circuit configured to output, to the processor of the seat unit, an on-off signal corresponding to an on-off state of a switch mounted on the seat; and
    a first power switch configured to turn the power supply to the switch input circuit on and off,
    wherein the transmitter of the vehicle unit is configured to transmit a start command, and wherein the processor of the seat unit is configured to switch, upon receipt of the start command during a standby state in which the first power switch is constantly turned off, to a normal state in which the first power switch is intermittently turned on after a predetermined amount of time, and to receive, after switching to the normal state, the on-off signal in response to turning on of the first power switch and to transmit the on-off signal to the vehicle unit.

2. The communication system according to claim 1, wherein the vehicle unit is configured to transmit a response signal upon receipt of the on-off signal from the seat unit,
wherein the seat unit further comprises a light detector configured to receive the response signal from the vehicle unit, and a second power switch configured to turn the power supply to the light detecting device on and off, and
wherein the processor is configured to intermittently turn on the second power switch during the standby state to allow the light detector to receive the start command, and to turn off the second power switch when the light detector receives the response signal after the second power switch is turned on in response to a transmission of the on-off signal during the normal state, and to switch, after the transmission of the on-off signal, to the standby state when the light detector is unable to receive the response signal.

3. The communication system according to claim 2, wherein the processor of the seat unit is configured to transmit the input on-off signal when the on-off signal is received at a timing for a regular communication, and to transmit, when the on-off signal is received at a timing other than the timing for the regular communication, the on-off signal only when the on-off signal is different from a previously transmitted on-off signal.

4. The communication system according to claim 1, wherein a seating switch connected in series with a buckle switch that transmits an on or off signal to the switch input circuit.

5. A seat unit configured to be mounted on a seat of a vehicle and to receive power supply from a battery to operate, the seat unit comprising:
a processor;
a switch input circuit configured to output, to the processor, an on-off signal corresponding to an on-off state of a switch mounted on the seat; and
a first power switch configured to turn the power supply to the switch input circuit on and off,
wherein the processor is configured to switch, upon receipt of a start command during a standby state in which the first power switch is constantly turned off, to a normal state in which the first power switch is intermittently turned on after a predetermined amount of time, and to receive, after switching to the normal state, the on-off signal in response to turning on of the first power switch and to transmit the on-off signal to a vehicle unit.

* * * * *